United States Patent [19]

Kendall

[11] Patent Number: 5,473,996
[45] Date of Patent: Dec. 12, 1995

[54] PORTABLE TRIPOD RISER

[76] Inventor: Charles S. Kendall, 6553 Kelsey Point Cir., Alexandria, Va. 22315

[21] Appl. No.: 262,014

[22] Filed: Jun. 17, 1994

Related U.S. Application Data

[63] Continuation-in-part of Ser. No. 205,545, Mar. 4, 1994.

[51] Int. Cl.[6] .................................................. A47B 57/00
[52] U.S. Cl. .............................................. 108/59; 108/128
[58] Field of Search ........................... 108/59, 115, 128, 108/38, 150, 157; 297/17, 16.2; 248/165, 160, 435, 170, 108.6, 108.7

[56] References Cited

U.S. PATENT DOCUMENTS

| 217,178 | 7/1879 | Waters | 108/128 X |
|---|---|---|---|
| 504,241 | 8/1893 | Patton | 248/435 X |
| 515,649 | 2/1894 | Brookmire, Jr. | 248/170 X |
| 1,226,554 | 5/1917 | Mante | 108/128 X |
| 1,277,988 | 9/1918 | Miller | 108/128 X |

FOREIGN PATENT DOCUMENTS 440889  10/1948  Italy ........................................ 108/38

*Primary Examiner*—Jose V. Chen
*Attorney, Agent, or Firm*—Randy W. Lacasse

[57] ABSTRACT

A tripod is elevated off the ground and supported by a three legged unit so that when opened it cradles the legs and/or the spreader of a tripod. The unit has a base which restricts movement of each of the support legs and an accompanying platform leaf for the purpose of supporting a tripod operator. The unit's legs collapse together and are secured allowing the entire unit to be easily transported.

19 Claims, 2 Drawing Sheets

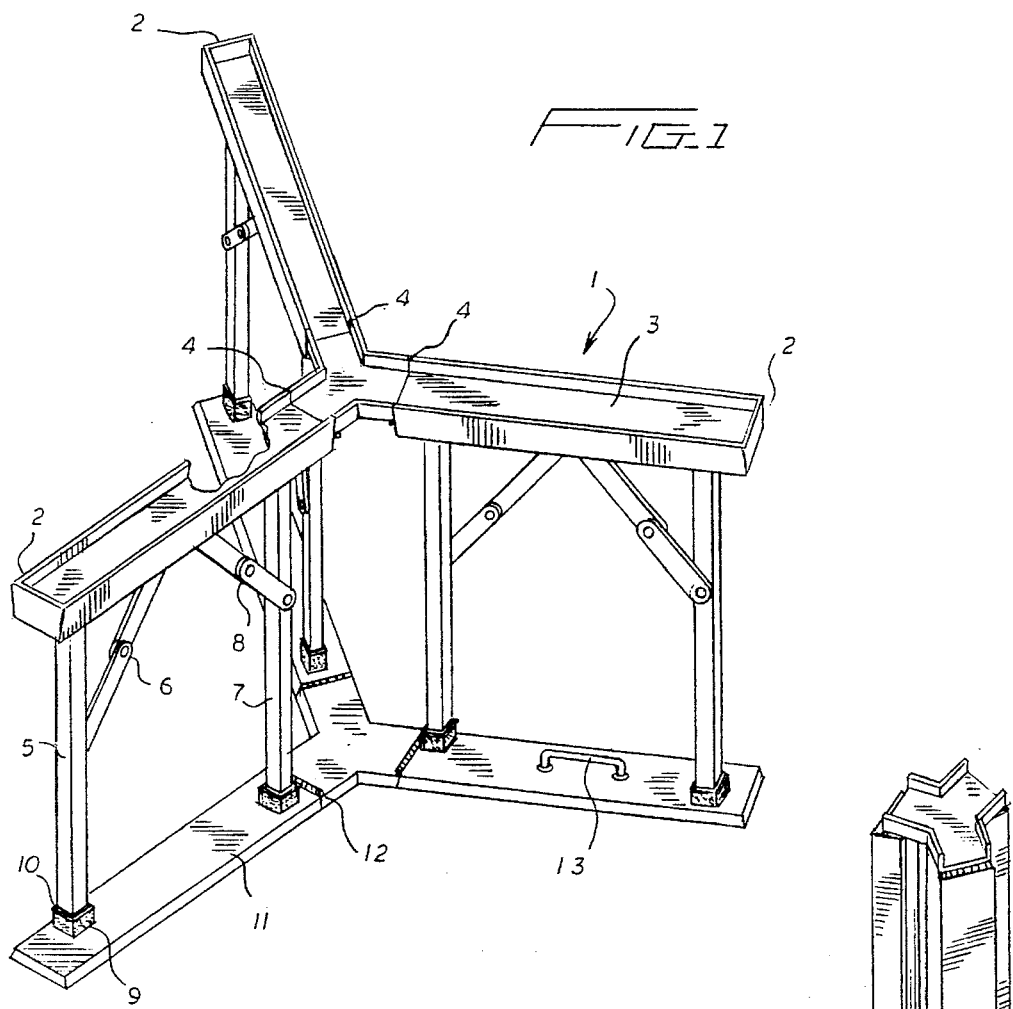
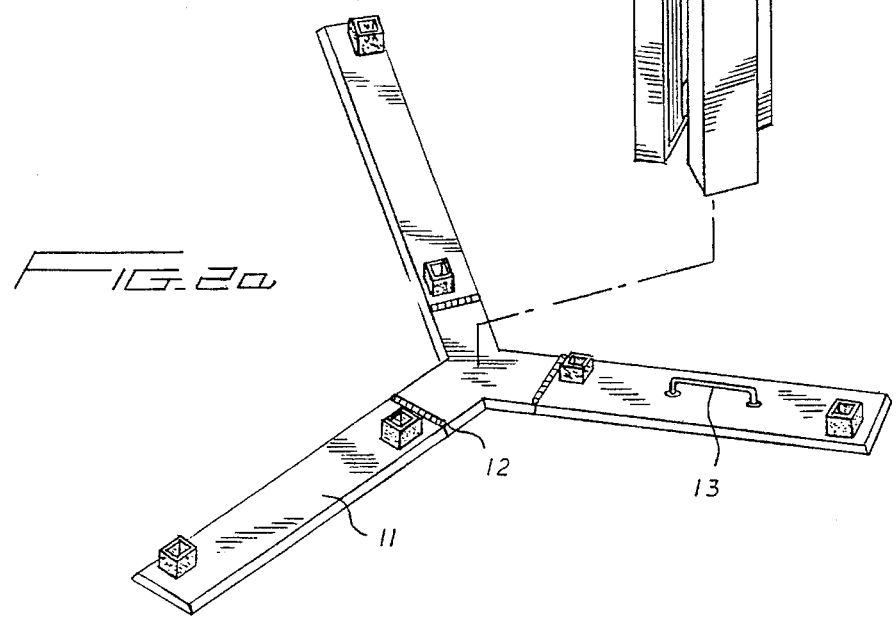

PORTABLE TRIPOD RISER

This application is a continuation-in-part of copending application Ser. No. 08/205,545, filed Mar. 4, 1994, pending.

BACKGROUND OF THE INVENTION

1. Field of Invention

This invention generally relates to instrument supporting platforms and more specifically is directed a portable riser to support and raise the elevation of tripods.

2. Discussion of Prior Art

When using a tripod to support an instrument, such as a camera, it is often desirable to raise the elevation of the tripod, and thus the camera, to achieve a more aesthetically pleasing picture. While most tripods have adjustable legs for the purpose of adjusting the instrument height, their maximum elevation is often limited to around five feet. Additionally, most individuals using the instrument mounted to the tripod cannot comfortably operate the instrument at elevations above five feet.

Conventional hotel type platforms, usually 8'×4', can sometimes be used to raise the tripod and operator to a higher elevation, however, these platforms are not very portable, extremely heavy, and consume a large amount of space in work environments where space is at a premium.

OBJECTS OF THE INVENTION

It is an object of this invention to provide for a portable tripod riser that, once set-up, supports and raises the elevation of an instrument supporting and/or an operator. Another object of the invention is to provide a riser that is portable and easily set-up by the operator. A further objective of the invention is to provide a tripod riser that consumes less space than traditional platform risers.

SUMMARY OF THE INVENTION

A portable tripod riser includes three elevated horizontal support legs to receive the three legs of an extended tripod. When opened, the three legs form a three pointed star. When closed, the legs are folded together for storage and transporting. An additional pair of folding legs opens downward underneath each of the three elevated horizontal support legs to support the tripod in a stable position. In addition, a separate lightweight platform accompanies the portable riser for the user to stand on to operate an electronic device (i.e. camera) which is usually attached to the top of the tripod.

Other objects and advantages of the invention will become apparent upon reading the following detailed description and upon reference to the drawings.

BRIEF DESCRIPTION OF THE DRAWINGS

FIG. 1 is a perspective view of the tripod riser of the present invention opened to the operating position.

FIG. 2a is a perspective view of the tripod riser with the vertical and horizontal support legs closed.

DESCRIPTION OF THE PREFERRED EMBODIMENTS

Figure 2B:
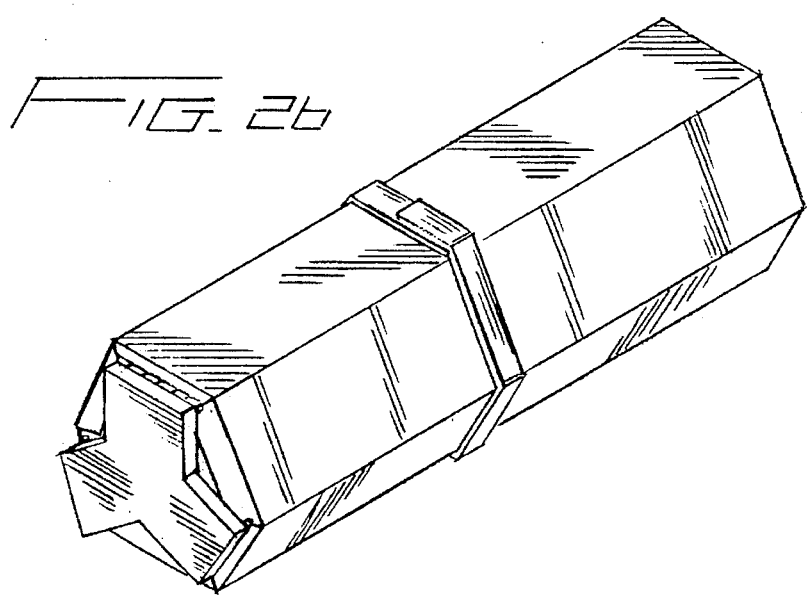
FIG. 2b is a perspective view of the tripod riser fully closed with a carrying handle.

While the invention will be described in connection with preferred embodiments, it will be understood that I do not intend to limit the invention to these specific embodiments. On the contrary, I intend to cover all alternatives, modifications and equivalents as may be included within the spirit and scope of the invention as defined by the appended claims.

Turning to the drawings, there is shown in FIG. 1 an instrument support device 1 having three identical upper horizontal support legs 2 centrally connected with each leg having a trough-like interior section 3 which receives and supports a respective leg and spreader of a tripod (not shown). The well is approximately 1" deep and is intended to hold any tripod and/or tripod spreader in place when set-up. Each support leg 2 is hinged 4 near the central connection point. This hinge 4 allows each support leg to fold downwardly to assist in compaction for carrying or storage.

Each leg 2 is supported by a pair of legs, outer 5 and inner 7, each with hinged support brackets 6 and 8 respectively. The legs 5 and 7 are offset with respect to each other such that they may fold into the upper support leg 2 remaining in parallel throughout the folding process. The legs 5 and 7 lie side-by-side in a resting position against leg 2 when completely folded. When unfolded, an end-cap 10 fits into a receiving section 9 located on a lower three legged support 11, to secure the leg for side-to-side stability and assurance of a proper full extension. The receiving section 9 may be either a raised or recessed section.

FIG. 2a illustrates a perspective view of partially a folded implementation of the present invention. Legs 5 and 7 are folded upwardly to a fully closed position and then legs 2 are folded downwardly from hinges 4. Lower support base 11 is turned approximately 60 degrees and each leg folded upwardly from hinges 12 thereby fitting into the space between legs 2. FIG. 2b illustrates the final closed position. As shown, each leg of lower base 11 is bevelled to allow for a close fit into the space between legs 2.

A velcro 18, or other suitable fastener, is used to secure the final closed device. The velcro strap 18 is wrapped around the periphery of the folded legs. A second velcro strap (not shown) may be included and spaced equally along the length of the device. A third strap, not shown, may be secured between the two velcro straps to serve as a handle. In an alternative embodiment, a spring biased recessed handle 13, may be included in one of the legs of lower base 11. When the base 11 is laid flat onto the floor the handle pushes upward into the base. When the base is elevated (i.e. in the process of being folded-up) the handle pops out to assist in carrying. The handle should be centrally located along the length of one leg of base 11 to provide for proper balance.

Figure 3:
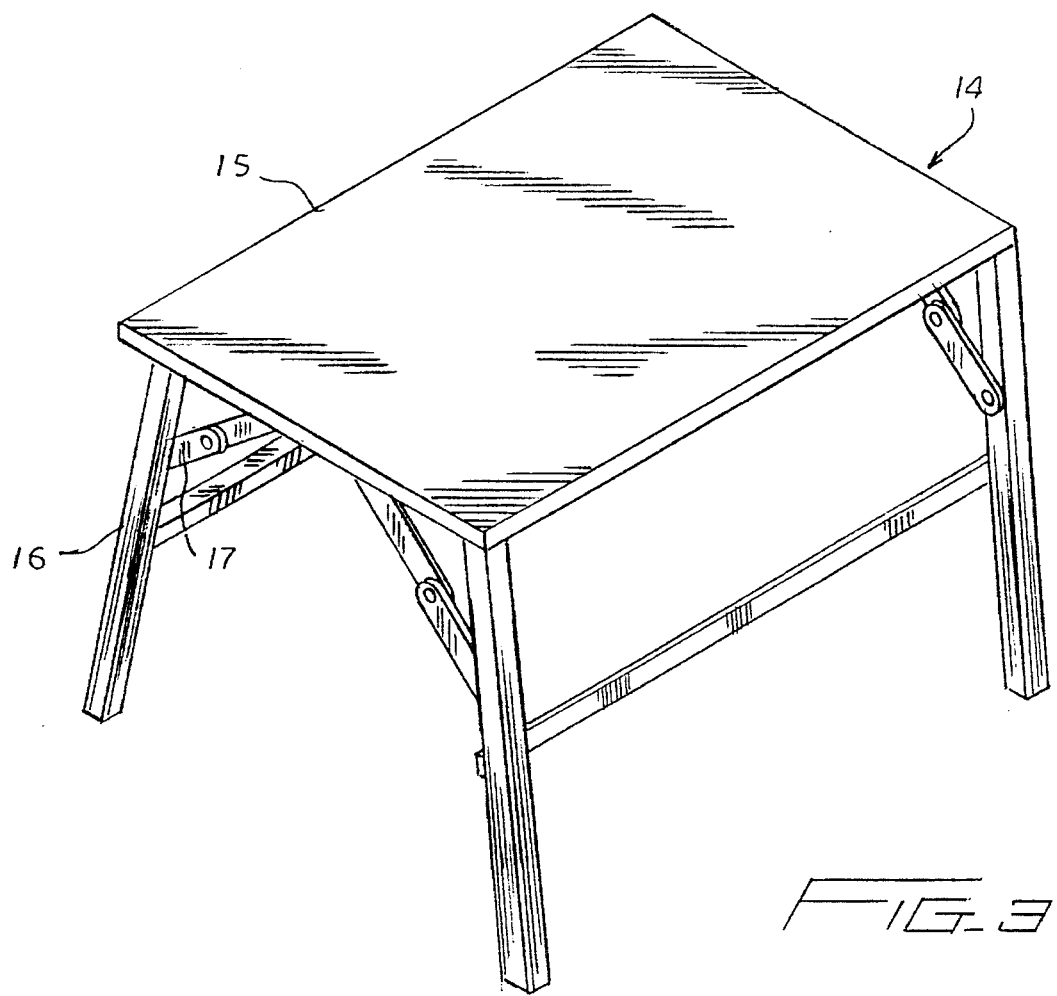
FIG. 3 is a perspective view of the accompanying platform.

FIG. 3 illustrates an accompanying platform 14 which is used to elevate the operator of the camera attached to the tripod. The platform must be lightweight and sturdy. The retractable legs 16 (with hinges 17) are slightly angled outwardly to allow the platform to be placed in close proximity to the riser without coming in contact therewith. Two of the legs 16 may be placed across the legs of base 11 to allow for the closest placement. The platform must be of equal or lesser size to the opening between each leg section 2 of the riser to prevent undesired contact and vibration of the riser.

In operation a user would:

1. Transport the device to a location to be used;
2. Remove velcro strap 18;
3. Remove base 11 and place onto floor or other desired location;
4. Open leg 2;
5. Unfold legs 5 and 7;
6. Lock into place by pushing down on braces 6 and 8;
7. Placing end caps into receiving section;
8. Sequentially repeat this process for the remaining two legs 2;
9. Mount tripod legs in recess well 3, and
10. Stand on platform 14 to operate equipment attached to tripod.

When finished the steps would be performed essentially in reverse to close and transport the device.

CONCLUSION

A system and method has been shown in the above embodiments for the effective implementation of a portable tripod riser. While various preferred embodiments have been shown and described, it will be understood that there is no intent to limit the invention by such disclosure, but rather, is intended to cover all modifications and alternate constructions falling within the spirit and scope of the invention as defined in the appended claims. For instance, the particular dimensions of the device should not be limited to that disclosed or shown in the preferred embodiment. The unit can be made as large or small as desired depending on height and/or tripod extension needed. The specific shape of the support or platform can be any such that the device would provide the function as described above. In addition, the particular materials used to construct the device need only meet the requirement of structural strength (i.e. to support camera equipment and a person for the platform) and be relatively light in weight (i.e. be portable). The specific handle, closure securing method or leg stabilizing (i.e. braces 6/8, end-caps, receiving section 9/10) can be modified and interchanged with equivalent methods without destroying the spirit or function of the invention.

I claim:

1. A portable tripod support platform which is collapsible into a folded non-use position for transporting comprising:
    a plurality of upper horizontal support sections each having an upper longitudinal recess;
    at least one vertical support leg pivotally connected to each of said upper horizontal support sections;
    a plurality of lower support sections each having a top side receiving section for receiving a lower end of each of said vertical support legs, and
    wherein said at least one vertical support leg pivots into and is at least partially encapsulated by said upper horizontal support section, said plurality of upper horizontal support sections are pivotally folded together, said lower support sections are pivotally folded together and secured to said folded horizontal support sections during non-use.

2. A portable tripod support platform as per claim 1, wherein each of said upper support sections further comprises a hinge to facilitate folding.

3. A portable tripod support platform as per claim 1, wherein each of said lower support sections further comprises a hinge to facilitate folding.

4. A portable tripod support platform as per claim 1, wherein each of said upper and lower support sections are centrally connected and separated equidistantly.

5. A portable tripod support platform as per claim 1, wherein upper edges of each of said lower support sections are bevelled.

6. A portable tripod support platform as per claim 1, wherein their are two of said vertical support legs per upper support section and they further comprise braces to lock into a fully extended position.

7. A portable tripod support platform as per claim 1, wherein each of said vertical support legs has an end-cap which fits into each of said respective receiving sections.

8. A portable tripod support platform as per claim 1, further comprising a handle attached to one of said lower support legs.

9. A portable tripod support platform which is collapsible into a folded non-use position for transporting comprising:
    a plurality of upper horizontal support sections each having an upper longitudinal recess;
    a plurality of vertical support legs pivotally connected to a lower side of each of said upper horizontal support sections;
    a plurality of lower support sections each having a top side receiving section for receiving a lower end of each of said vertical support legs;
    wherein said upper horizontal support sections are centrally connected, said lower support sections are centrally connected, and
    wherein said at least one vertical support leg pivots into and is at least partially encapsulated by said upper horizontal support section, said plurality of upper horizontal support sections are pivotally folded together, said lower support sections are pivotally folded together and secured to said folded horizontal support sections during non-use.

10. A portable tripod support platform as per claim 9, wherein each of said upper support sections further comprises a hinge to facilitate folding.

11. A portable tripod support platform as per claim 9, wherein each of said lower support sections further comprises a hinge to facilitate folding.

12. A portable tripod support platform as per claim 9, wherein each of said upper and lower support sections are equidistantly separated.

13. A portable tripod support platform as per claim 9, wherein upper edges of each of said lower support sections are bevelled.

14. A portable tripod support platform as per claim 9, wherein their are two of said vertical support legs per upper support section and they further comprise braces to lock into a fully extended position.

15. A portable tripod support platform as per claim 9, wherein each of said vertical support legs has an end-cap which fits into each of said respective receiving sections.

16. A portable tripod support platform as per claim 9, further comprising a handle attached to one of said lower support legs.

17. A portable tripod support platform which is collapsible into a folded non-use position for transporting comprising:
    a plurality of centrally connected upper horizontal support sections each having an upper longitudinal recess;
    a plurality of vertical support legs pivotally connected to a lower side of each of said upper horizontal support sections;
    a plurality of centrally connected lower support sections each having a top side receiving section for receiving a lower end of each of said vertical support legs, and wherein said upper horizontal support sections are equidistantly connected, said lower support sections are equidistantly connected and said plurality of vertical support legs pivot into and are at least partially encapsulated by said upper horizontal support sections, said plurality of upper horizontal support sections are pivotally folded together, said lower support sections are pivotally folded together and secured to said folded horizontal support sections during non-use.

18. A portable tripod support platform as per claim 17, wherein each of said upper and lower support sections further comprises a hinge to facilitate folding.

19. A portable tripod support platform as per claim 17, wherein each of said vertical support legs has an end-cap which fits into each of said respective receiving sections.

* * * * *